United States Patent [19]

Waters et al.

[11] Patent Number: 4,665,816

[45] Date of Patent: May 19, 1987

[54] METHOD AND APPARATUS FOR AUTOMATICALLY CONTROLLING JUICE FINISHING MACHINE

[75] Inventors: Roger D. Waters, Auburndale; John E. Cox; Rodney W. Swofford, both of Winter Haven, all of Fla.

[73] Assignee: Brown International Corporation, Covina, Calif.

[21] Appl. No.: 843,374

[22] Filed: Mar. 24, 1986

[51] Int. Cl.[4] .......................... B30B 15/34; B30B 9/02; A23N 1/00

[52] U.S. Cl. .......................................... 100/38; 99/504; 100/53; 100/98 R; 100/121; 100/147

[58] Field of Search ................. 100/38, 53, 98 R, 121, 100/147; 99/504

[56] References Cited

U.S. PATENT DOCUMENTS 2,631,625 3/1953 Wells ..................................... 99/504
3,370,527 2/1968 Holbrook ............................. 100/147
4,170,935 10/1979 Rohm et al. ......................... 100/121
4,266,473 5/1981 Hunt et al. ...................... 100/147 X
4,291,619 9/1981 Hunt et al. ......................... 100/98 R

*Primary Examiner*—Louis K. Rimrodt
*Attorney, Agent, or Firm*—Paul A. Weilein

[57] ABSTRACT

A method and apparatus is disclosed for automatically controlling operation of a juice finishing machine of a type having a cylindrical perforated screen in a housing forming an inlet for introducing initial juice or the like into an interior portion of the screen, temperature of juice solids in the pad area and temperature of the initial juice entering the machine being separately monitored and converted to proportional electrical signals, a differential controller establishing a differential output signal proportional to the differential between the sensed temperatures, the differential electrical signal being converted to a pneumatic signal suitable for regulating operation of the actuator means in order to automatically control finished quality of juice product from the machine. A fail-safe control is also provided for establishing a predetermined setting for the actuator means if the differential electrical signal exceeds predetermined limits.

20 Claims, 4 Drawing Figures

METHOD AND APPARATUS FOR AUTOMATICALLY CONTROLLING JUICE FINISHING MACHINE

BACKGROUND OF THE INVENTION

The present invention relates to finishing machines of a type having a cylindrical screen for removing solids from juice or the like, and more particularly to a method and apparatus for automatically regulating operation of the finishing machine. It is particularly contemplated that the method and apparatus of the invention be employed in connection with the finishing of initial juices obtained, for example, from fruits, particularly citrus fruits, and vegetables such as tomatoes. Such juices commonly contain solids and it is generally desirable to regulate the amount of solids in a juice product obtained by finishing of the initial juice.

In the production of juices from various fruits and vegetables, juice extraction machines are commonly employed to first obtain an initial or raw juice containing substantial amounts of various solids such as rag, pulp from juice sacs, pectinous material, seeds, etc. Typical examples of juice extraction machines for obtaining initial or raw juice from various fruits and vegetables are disclosed, for example, in U.S. Pat. Nos. 2,631,625 and 4,170,935. The construction and method of operation contemplated for these machines is not of particular concern in connection with the present invention. Rather, the above-noted patents are referred to herein only for the purpose of demonstrating an exemplary source for the initial or raw juice with which the method and apparatus of the present invention are contemplated for use.

In order to produce commercially desirable juice from such initial or raw juice, it is generally necessary or desirable to first remove a substantial portion of the solid components from the initial juice to provide a so-called finished juice.

A typical commercial machine for converting initial or raw juice to a finished juice, characterized as being a screw-type finisher, is disclosed, for example, in Holbrook U.S. Pat. No. 3,370,527. In a finisher of this type, the initial juice or slurry is introduced into the interior of a stationary cylindrical screen. The screen is in effect a thin-walled cylindrical member, preferably formed from stainless steel, with very samll, closely spaced extrusion openings or perforations formed about its circumference and along its length.

Rotary screws for finishing machines are designed to have a fairly close tolerance fit within the cylindrical screen. The screw is rotated to conduct the initial juice or slurry along the axial length of the screen, forcing a liquid juice portion through the screen while a substantial portion of solids from the initial juice is retained upon the screen and conducted to a point of discharge. The finishing machine of the above-noted patent is at least partially described in greater detail below only for the purpose of assuring a complete understanding of the present invention.

However, the present invention is not limited to a particular type of finisher or even to a particular screw-type finisher as described above. For example, screw-type finishers tend to be of two different types. In one type, the screen and the outside diameter of the rotating screw element are tapered with the small diameter being located at the discharge end. The rotary screw is tapered and the pitch of its flights varies so that the cross-sectional area between the flights decreases at the discharge end. In other screw-type finishers, the screen and the outside diameter of the screw are cylindrical and are of generally constant diameter. The rotary screw may be conical with the large diameter at the discharge end, or the rotary screw may be cylindrical.

In both of the above types of screw finishers, an air-loaded pulp or solids outlet valve is provided at the discharge end of the screen. As the fluid or juice component from the initial juice or slurry passes through the screen, substantial solids build up on the screen in a so-called "pad" area near the discharge end or solids outlet of the machine. Pressure in the cylinder is regulated to vary or adjust axial force applied to the valve in order to establish, maintain or selectively vary back pressure applied to the slurry solids by interaction of the outlet valve and screen.

In any event, regardless of the particular type of finishing machine being used, solids from the initial juice tend to build up on the screen and to plug the screen openings, thus interferring with continued operation and/or varying output characteristics of the finished juice product.

Solids build-up within the finishing machine and characteristics of the finished juice product tend to vary substantially, primarily because of operating conditions and characteristics of initial juice supplied to the finishing machine. Keeping in mind such variable operating conditions and variations in initial juice quality, it is generally an ultimate goal in finishing operations to recover as much of the liquid juice portion from the initial juice while maintaining acceptable juice quality as determined, for example, by "in-plant" standards and also requirements of various government agencies.

Considering as an exemplary application a finishing operation for citrus fruits, variations in initial juice supplied to the finishing machine may exhibit substantial variations in characteristics such as those set forth below:

(1) Initially, different characteristics will result for different types of fruit which may be processed in the same finishing operation, for example, various citrus fruits such as grapefruit, navel oranges, mandarin organes, lemons, etc.

(2) Even for a single type of fruit, the maturity of the fruit may affect both physical and chemical compositions of the initial juice.

(3) The degree of juice extraction accomplished with a juice extractor such as those described above may vary characteristics of the initial juice, for example, because of the quantity of membranous material, seeds, juice sacs and other non-juice components which are to be at least partially removed from the liquid juice by the finisher.

(4) Climate or weather may have substantial effects on quality of the fruit and accordingly quality of the initial juice. In this regard, it is believed obvious that quality of the initial juice will be affected by conditions such as freezing, heat waves, drought, etc., during the growth and maturity of the fruit.

(5) Climate and weather may also have an effect during the finishing operation itself. For example, operation of the finishing machine may be affected by weather conditions during the finishing operations. Furthermore, characteristics of the initial juice such as its temperature upon being introduced into the finishing machine will also depend upon climate or weather during the finishing operations.

(6) In addition to extraction characteristics described above, the rate of extraction may cause variations in the amount and quality of initial juice flow to the finisher due, for example, to changes in fruit size distribution, juice content of the fruit, extractor feeding efficiency and possibly unique standards established by a human operator controlling the extractor and finishing machines.

In the past, periodic adjustments have been made in the finishing machine to compensate for conditions such as those listed above. Such adjustments include changing of the hole size of the screen, adjustment of rotating speed for the screw and discharge valve pressure. Typically, changes in screen hole size and screw speed are made only infrequently, for example, once or twice a season, because of the substantial down time involved. On the other hand, discharge valve pressure adjustments may be made more frequently, typically, at least on a weekly or monthly basis.

In adjusting discharge valve pressure for finishing machines, it has generally been prior art practice to monitor output characteristics of the juice at selected intervals and to make any adjustments in the discharge valve pressure as may be required by that analysis. Accordingly, substantial variations may occur in quality of the finished juice product, particularly because of the amount and type of solids remaining in the juice. These characteristics in the finished juice product can be directly attributed to operation of the finishing machine. For example, solids or non-juice components increase in concentration as they are retained by the cylindrical screen in the finishing machine and move axially toward the solids outlet or discharge valve. The non-juice components or "pomace" become compacted near the discharge end of the finishing machine in a zone upon the cylindrical screen commonly referred to as the "pad" area. The length of the pad area varies somewhat depending on design and operating speed of the screw element. The amount of compression which occurs within the solids or pomace in the pad area in turn determines the amount of juice left in the pomace and the degree of dryness in the pomace as it is discharged through the valve area of the finishing machine. The compression or compaction of the pomace continues and increases until the pneumatic force applied to the valve is balanced or overcome. Thus, compaction and discharge of pomace or solids from the finishing machine occurs at a rate generally proportional to the amount of pomace in the initial juice supplied to the finishing machine, at least for a constant outlet valve pressure setting.

Pomace or non-juice particles (pulp particles) are also forced outwardly through the screen due to these compaction forces and form a portion of the finished juice product from the finishing machine. A certain amount of these particles is desirable in order to provide "body" within the finished juice. However, excessive amounts are undesirable in that they tend to cause bitterness in the juice and result in undesirably high viscosity.

Accordingly, there has been found to remain a need for a method and apparatus for automatically and accurately regulating the amount of solids in finished juice in order to assure that the finished juice meets high quality standards.

SUMMARY OF THE INVENTION

It is therefore an object of the invention to provide a method and apparatus for automatically adjusting finishing machines during operation in order to achieve a number of advantages, including the ability to optimize the amount of finished juice obtained from the initial juice and to maintain quality of the finished juice, particularly due to the amount of solids remaining in the finished juice.

It is more particularly an object of the invention to provide a method and apparatus for automatically controlling finished quality of juice products obtained from finishing machines of a type having a generally cylindrical perforated screen arranged in a housing defining an inlet for receiving initial juice, a screw element for urging the initial juice against the screen, an element which is movable with respect to the screen for defining a variable solids outlet and actuator means for urging the element toward the screen under a pressure regulating the passage of juice solids from the screen interior, the juice solids also tending to deposit in a pad area on the cylindrical screen adjacent the solids outlet.

In such a finishing machine, the method and apparatus of the present invention contemplate means for sensing temperature of the deposited juice solids in the pad area of the screen, means for regulating operation of the actuator means and adjusting means operatively coupled with the temperature sensor means and the regulating means for adjusting the actuator means relative to temperature of the deposited solids as a means for determining the amount or rate of solids to be released through the solids outlet and at the same time to closely regulate the amount of solids remaining in the finished juice product from the machine.

In connection with the above-noted objects of the invention, it has been observed that if the liquid flow rate to the finishing machine decreases, the pomace discharge from the machine becomes dryer and juice passing through the screen, at least near the pad area, exhibits increased solids content and viscosity. At the same time, both pomace and juice from the pad area have been found to exhibit significantly increased temperatures under such low liquid flow rates. It has further been observed that if the outlet valve pressure is reduced at such periods of low liquid flow rate to the finishing machine, the dryness of the pomace, the viscosity of the juice, the solids content of the juice and temperature of the finished juice product may be maintained at optimum conditions corresponding to greater liquid flow rates to the finishing machine.

It was further observed that such finishing operations may make it impractical to manually adjust outlet pressure in response to each variable such as liquid flow rates toward the finishing machine, climactic conditions, etc. Accordingly, the method and apparatus of the present invention basically contemplates automatically making such adjustments depending upon the temperature of the pomace or solids build-up in the pad area of the screen to permit continual adjustment of outlet pressure in the finishing machine in order to maintain optimum quality of the finished juice product.

Temperature variations within the pomace or solids build-up in the pad area of the screen are believed to be due to frictional and/or shear forces which occur during compression of the pomace by operation of the finishing machine. An increase in these forces during low liquid flow rates to the finishing machine thus tends to result in an increased quantity of pulp particles being forced through the finishing screen with a corresponding reduction in quality of the finished juice product. The automatic control provided by the method and apparatus of the present invention eliminates this undesirble characteristic and maintains high quality in the finished juice product.

It is a further object of the invention to provide such a method and apparatus wherein temperature is also monitored for initial juice supplied through an inlet of the finishing machine with pressure at the outlet valve of the finishing machine being adjusted in accordance with the differential between the temperature of the initial juice supplied to the finishing machine and the temperature of pomace or solids build-up in the pad area of the screen.

In this manner, even more accurate control over quality of the finished juice product is made possible. Pressurization of the outlet valve in response to the temperature differential between the initial juice and solids build-up in the finishing machine allows more accurate response to the liquid content of the initial juice. In other words, the use of this differential temperature avoids pressure adjustments depending on temperature variations in the pomace or solids build-up on the pad area of the screen which are due at least in part to the temperature of the initial juice as it is supplied to the finishing machine. In connection with the present invention, it is noted that there is a relationship between BTU's of work and the temperature differential. For example, the temperature differential exists only as a result of work expended and the amount of this work (measured in BTU's for instance) is also directly related to the valve pressure.

It is also an object of the invention to provide such a method and apparatus wherein the temperature of the solids build-up in the pad area of the screen, and the temperature of the initial juice if desired, are monitored and converted to electrical signals which are then processed and converted to a pneumatic pressure for operating the outlet valve.

It is yet a further object of the invention to provide such a method and apparatus including a fail-safe feature establishing maximum limits for the signal operating the outlet valve. Preferably, the fail-safe feature includes means for operating the outlet valve at a predetermined pressure level if the operating signal exceeds predetermined limits.

Additional objects and advantages of the invention are made apparent in the following description having reference to the accompanying drawings.

DESCRIPTION OF THE PREFERRED EMBODIMENT

Figure 1:
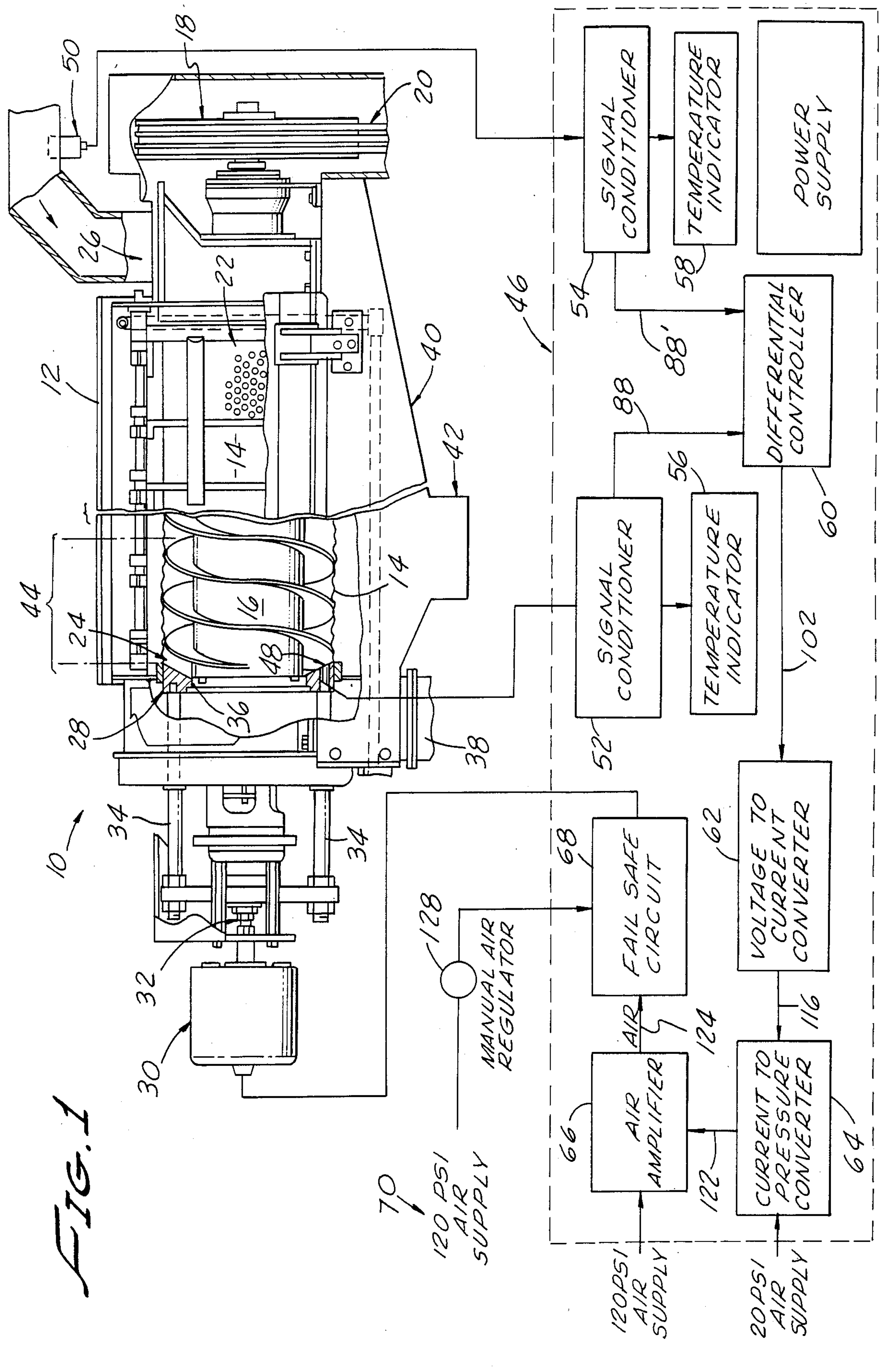
FIG. 1 is a fragmentary representation of a finishing machine and a schematic representation of control means for automatically adjusting the finishing machine in accordance with the present invention.

Referring now to the drawings and particularly to FIG. 1, a finishing machine, generally indicated at 10, is of a type contemplated for use with the automatic control method and apparatus of the present invention. The finishing machine 10, apart from the method and apparatus for achieving automatic control, is substantially similar to that summarized above and described in greater detail within the above-noted U.S. Pat. No. 3,370,527. The construction and operation of the finishing machine 10 is described briefly below only for the purpose of assuring complete understanding of the method and apparatus for achieving automatic control of such a finishing machine.

Continuing with particular reference to FIG. 1, the finishing machine 10 includes a housing 12 within which is arranged a cylindrical screen 14. A screw element 16 is arranged within the cylindrical screen 14 and is mounted for rotation relative to the screen. The screw element 16 is driven in rotation through pulleys 18 and drive belts 20 by a suitable motor (not shown).

Opposite ends 22 and 24 of the cylindrical screen 14 are open. One end 22 of the screen forms an inlet means for receiving initial juice or the like within the screen. The other end 24 of the screen forms a solids outlet described in greater detail below.

Initial juice or the like is introduced into the interior of the cylindrical screen 14 through an inlet 26 arranged at the inlet end 22 of the cylindrical screen. At the outlet end 24 of the screen 14, a cone-shaped element 28 is adjustably urged toward the screw element 16 by an air cylinder assembly 30 interconnected with the cone-shaped element 28 by a piston rod 32 and a plurality of parallel bars 34.

Initial juice entering the inlet end 22 of the cylindrical screen by means of the inlet 26 comprises both a liquid portion and a pomace or solids portion as discussed in greater detail above. As the initial juice is urged leftwardly through the cylindrical screen 14 by operation of the screw element 16, see FIG. 1, liquid portions of the initial juice are forced radially outward through openings in the perforated screen 14. Pomace portions of the initial juice are retained within the screen and are urged toward the outlet end 24 of the screen where they pass from the interior of the screen through a pomace or solids outlet passage 36 into a discharge chute 38.

During operation of the finishing machine 10, a liquid portion of the initial juice passing radially outwardly through the perforated screen 14 is collected in a liquid discharge chute 40 and directed toward a liquid outlet 42.

During operation of the finishing machine 10, pomace or solids tend to build up on the surfaces and within the openings of the cylindrical screen 14, particularly in a pad area 44 generally indicated adjacent the outlet end 24 of the screen. As noted above, the present invention provides a method and apparatus for adjustably regulating operation of the finishing machine and particularly the air cylinder assembly 30 for enhancing the quality of the finished juice in the outlet 42. Thus, the invention permits adjustment in the finished juice with respect to various characteristics such as the quality of initial juice supplied to the finishing machine and climatic conditions during the finishing operation, for example. These variables were discussed in greater detail above.

It is again noted that the outlet valve or a cone element 28 is automatically adjusted by the air cylinder assembly 30 particularly in response to the temperature of pomace or solids build-up on the screen in the pad area 44. It will be apparent that adjustment of the air cylinder assembly 30 could be made dependent only upon variations in that temperature. However, in order to assure more accurate control over characteics of the finished juice product, the temperature of inlet juice supplied to the finishing machine is also monitored. In that preferred configuration, adjustemnt of the valve element or cone element 28 by the air cylinder 30 is preferably adjusted in proportion to the differential between temperatures sensed for pomace or solids build-up in the pad area of the screen and initial juice supplied to the finishing machine respectively.

A control circuit for accomplishing this function is schematically represented in FIG. 1 and generally indicated at 46. The control circuit 46 includes temperature sensors 48 and 50 arranged within different portions of the finishing machine 10 as also noted above. Both of the temperature sensors 48 and 50 are laser trimmed thermisters of a conventional type commercially available from a number of sources.

The temperature sensor 48 for monitoring temperature of the pomace or solids deposit within the pad area 44 is located in the outlet valve or cone element 28. The temperature sensor 50 for monitoring the temperature of inlet juice flowing into the finishing machine 10 is located in the inlet chute 26.

A first signal conditioner 52 is coupled with the solids temperature sensor 48 while a second signal conditioner 54 is coupled with the inlet juice temperature sensor 50. Each of the signal conditioners 52 and 54 generally comprises an instrument amplifier with a Wheatstone Bridge input as better illustrated in FIG. 2A and described in greater detail below. Each of the signal conditioners 52 and 54 also serves to produce an output electrical signal proportional to the temperature sensed in the respective sensor. The signal conditioners 52 and 54 also include visual temperature indicators 56 and 58 respectively.

A differential controller 60 is operatively coupled with the signal conditioners 52 and 54 for comparing their output electrical signals or voltages and providing an output electrical signal or voltage proportional to the differential between the signals from the conditioners 52 and 54.

The differential electrical signal from the differential controller 60 is communicated to a voltage-to-current converter 62 which produces an electrical signal proportional to the differential voltage from the controller 60 with a variable current, for example, in the range of 4 to 20 milliamps.

The differential current signal from the converter 62 is supplied to a current-to-pressure converter 64 which provides a variable air pressure output signal, for example, in the range of 3 to 15 pounds per square inch (psi) which in turn is communicated to an air amplifier 66.

Output air pressure from the air amplifier 66, in the amplified range of 12 to 90 psi is supplied to the air cylinder assembly 30 for positioning the valve or cone element 28 as described above. It may thus be seen that, as described above, increasing air pressure from the air amplifier 66 causes the air cylinder assembly 30 to urge the valve or cone element 28 toward the outlet end 24 of the cylindrical screen 14 with increasing pressure to further restrict passage of solids from the interior of the screen.

Figure 2A:
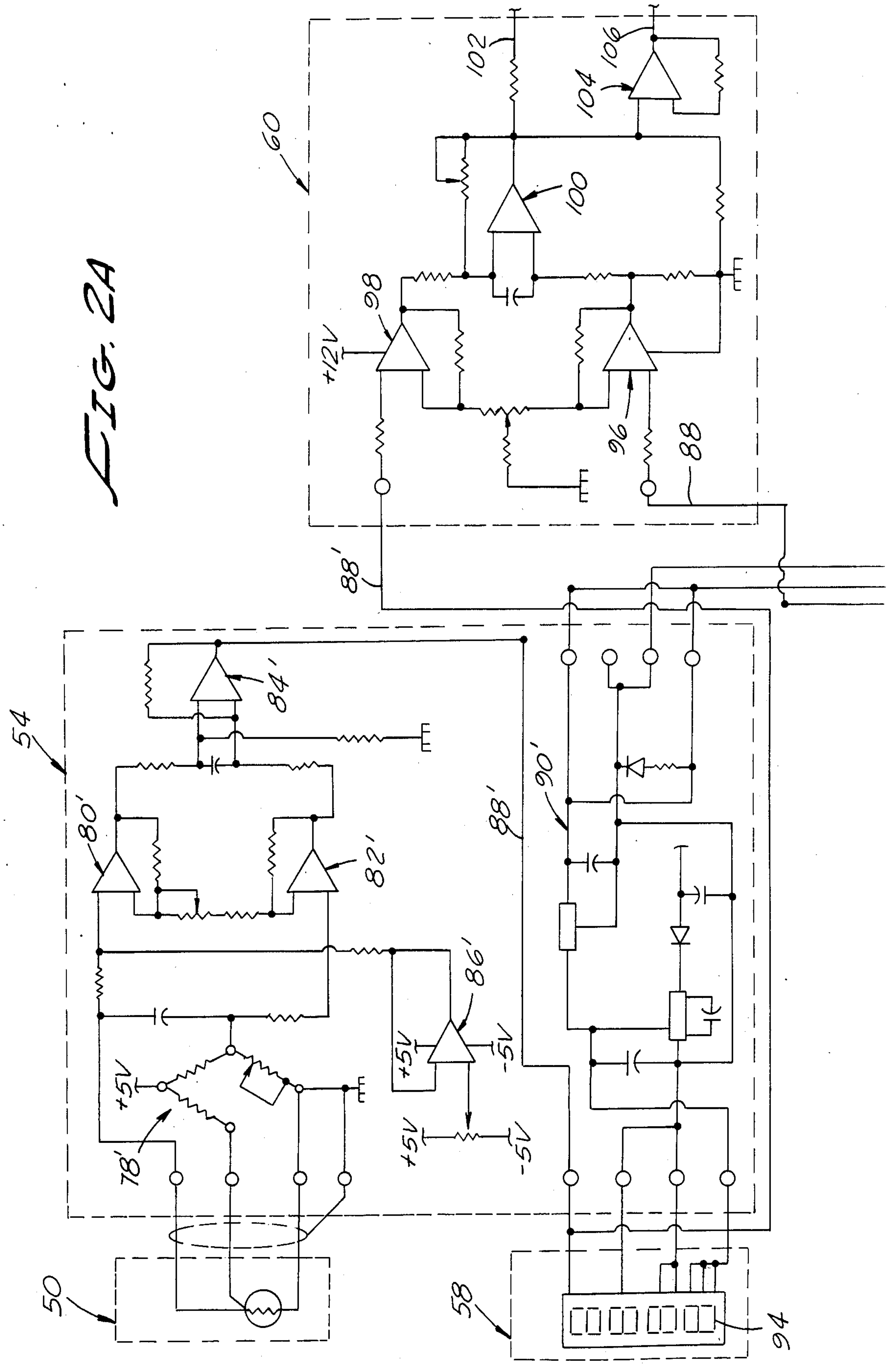
FIGS. 2A, 2B and 2C in combination illustrate a preferred electrical circuit embodying the apparatus of the invention and permitting operation in accordance with the invention.
Figure 2B:
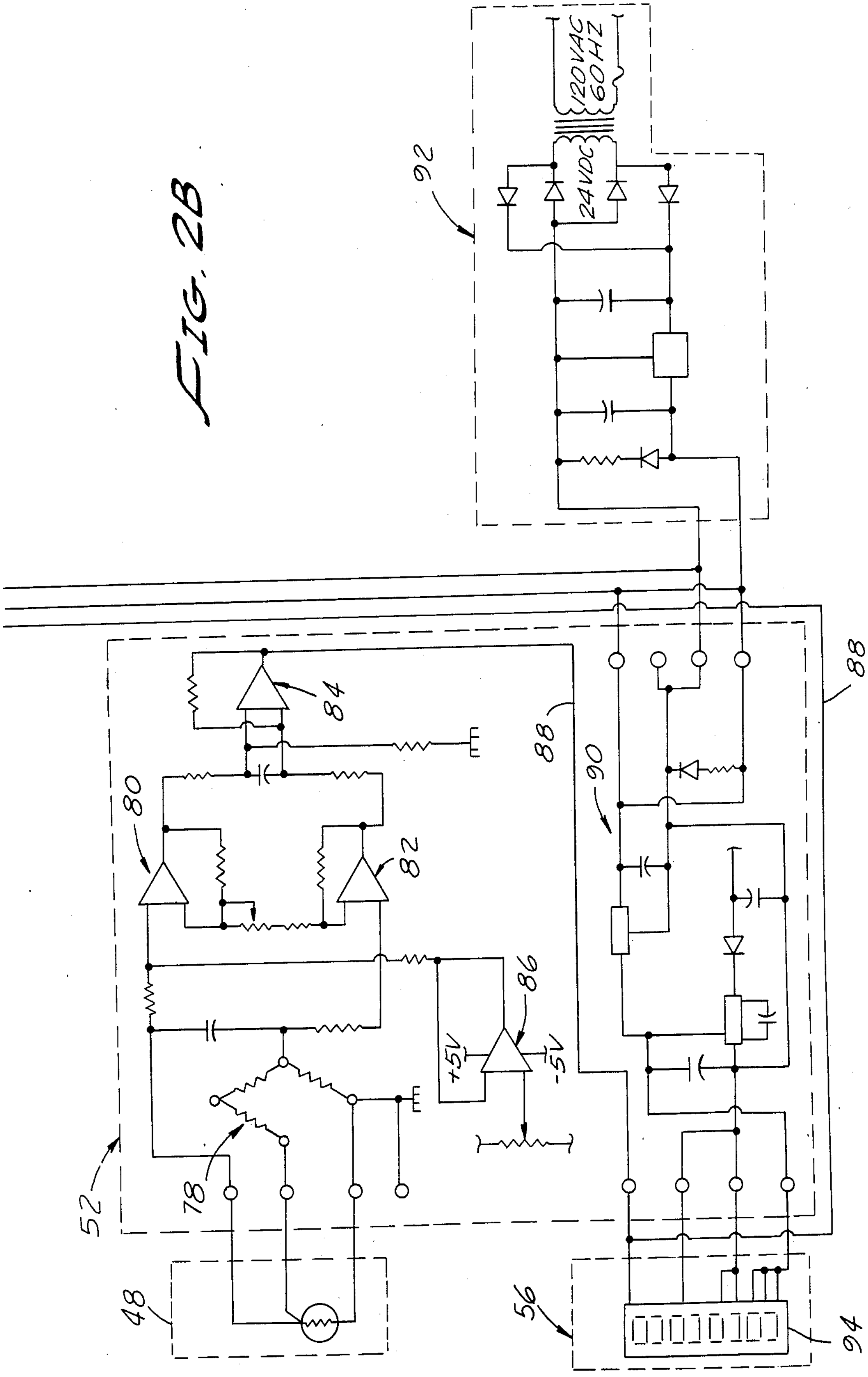
Figure 2C:
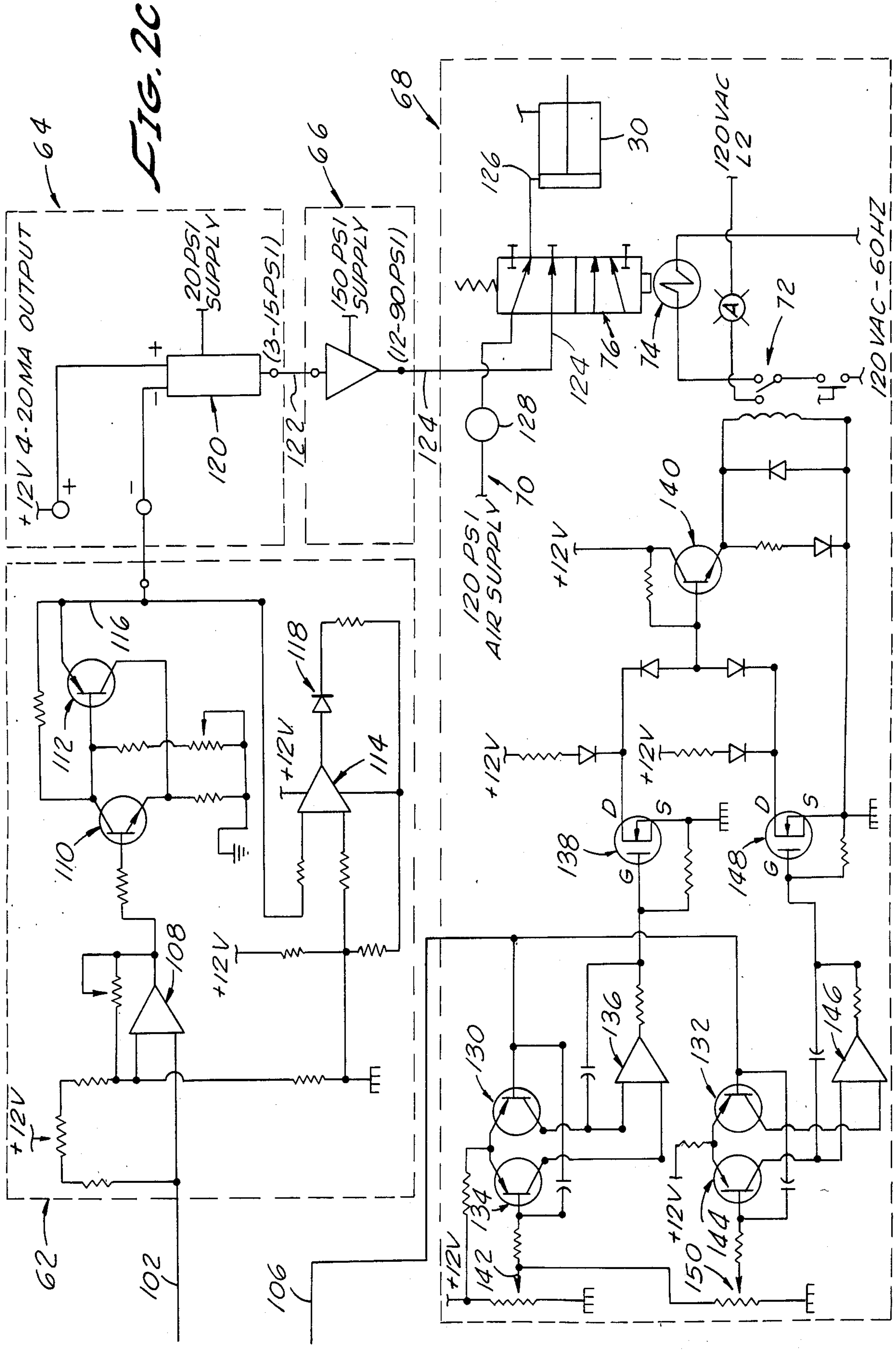

A fail-safe circuit 68 is interposed between the air amplifier 66 and the air cylinder assembly 30 as described in greater detail with respect to the circuit of FIGS. 2A, 2B, and 2C. The fail-safe circuit 68 is also connected with a separate air pressure source 70 through a valve 72 which can be operated manually (see FIG. 2C) in a manner described in greater detail below with reference to the circuit of FIGS. 2A, 2B and 2C.

Generally, the fail-safe circuit 68 allows the air cylinder assembly 30 to operate automatically in response to the air amplifier 66 unless the air pressure signal from the amplifier 66 falls above or below predetermined air pressure limits. In such an event, or if there is a loss of control power, a solenoid 74 is deenergized, causing the air valve 76 (see FIG. 2C) to supply a fixed and predetermined air pressure to the air cylinder assembly 30 from the source 70.

The manner of operation for the control circuit 46 is described in greater detail below having reference to FIGS. 2A, 2B and 2C. However, from the preceding summary in connection with FIG. 1, it may be seen that the control circuit 46 functions to monitor the temperature of initial juice at the inlet 26 and the temperature of pomace or solids at the discharge end 24 of the finisher screen. The values of these two temperature readings are converted to electrical signals and compared in the controller 60 to produce a linear output voltage signal proportional to the differential temperature. This linear voltage signal and the resulting differential current signals and differential air signals subsequently produced in the control circuit 46 provide a measurement of mechanical work on the pomace or solids build-up in the pad area of the screen. That same signal is converted to a proportional pneumatic signal which operates the outlet valve or cone element 28 through the air cylinder assembly 30 as described above to automatically regulate operation of the finishing machine 10 and to maintain high quality of finished juice product from the machine. The particular air pressures and electrical current levels are set forth only to clarify and in no way to limit the invention.

With the preferred arrangement illustrated in FIGS. 1, 2a, 2B and 2C, including temperature sensors for both pomace desposited on the screen and initial juice supplied to the finishing machine, it can be seen that force applied against the pomace discharge valve or cone element 28 against the deposited pomace on the discharge end 24 of the screen 14 is a function of the differential temperatures between the initial juice supplied to the finishing machine and the pomace body in the pad area 44.

Referring now to FIGS. 2A, 2B and 2C, the control circuit 46 is illustrated in greater detail in order to assure a complete understanding of the method and apparatus of the invention. Generally, the circuit components illustrated within FIGS. 2A, 2B and 2C are conventional in themselves and are described briefly below only to assure a complete understanding of the invention.

It is again noted that the method and apparatus of the present invention are particularly novel when considering the components of the control circuit 46 in combination with the finishing machine 10 as illustrated in FIG. 1. The manner in which the circuit components of FIGS. 2A, 2B and 2C are interconnected will be apparent from the following description.

The first or solids temperature sensor 48 forms one leg of a Wheatstone Bridge generally indicated at 78 within the first signal conditioner 52. Accordingly, a change in temperature monitored by the sensor 48 creates an output change for the bridge network 78 which is applied to paired operational amplifiers 80 and 82 forming the input section of the instrument amplifier or conditioner 52. Operational amplifiers 84 and 86 form the balance of the instrument amplifier. The operational amplifier 84 functions within the circuit of the conditioner 52 to provide an output voltage signal through a line 88 to the temperature indicator 56 and other portions of the control circuit 46 as described in greater detail below. The signal conditioner 52 also includes a power regulator section 90 for coupling a common power supply 92 for the control circuit 46 with the temperature indicator 56 and the first signal conditioner 52.

The second signal conditioner 54 includes similar components, indicated respectively by similar primed numerical labels, corresponding to those used above in the signal conditioner 52. Accordingly, variable electrical signals from the first and second signal conditioners 52 and 54, proportional respectively to temperatures sensed by the sensors 48 and 50, are supplied to the differential controller 60 through the respective lines 88 and 88'.

Before proceeding with a description of the differential controller 60, it is noted that both the temperature indicators 56 and 58 preferably comprise digital voltmeter means 94 scaled to provide a visual reading in degrees Fahrenheit. As noted above, the indicators 56 and 58 are also responsive to the respective signals from the lines 88 and 88'.

The differential controller 60 is an instrument amplifier configured as a differential controller, the two voltage levels from the lines 88 and 88' being respectively applied to operational amplifiers 96 and 98, the operational amplifiers 96 and 98 being coupled with an output operational amplifier 100 for producing a differential voltage signal output in a line 102.

Another operational amplifier 104 within the differential controller functions as a voltage follower to provide an output signal in a line 106 which is connected with the fail-safe circuit 68 as described in greater detail below. The differential voltage signal from the differential controller 60 is applied through the line 102 to an operational amplifier 108 in the voltage-to-current converter 62. Output from the operational amplifier 108 provides base drive for a transistor 110 which functions in combination with a second transistor 112 and another operational amplifier 114 to provide a variable current signal to a line 116 which is proportional to the variable voltage signal in the line 102. The operational amplifier 114 produces an output signal which acts on a diode 118 to provide a visual loop current closed indicator.

The current-to-pressure converter 64 includes converter means 120 which supplies a range of from 3 psi to 15 psi air or pneumatic pressure output in a conduit 122 in response to an input signal from the line 116 in the range of from 4 to 20 milliamps, for example.

The variable air pressure signal from the converter 64 is in turn supplied to the air amplifier 66 which produces an output pressure in a conduit 124 of from 12 to 90 psi in response to the signal of from 3 to 15 psi from the conduit 122.

The air pressure signal from the conduit 124 is supplied to the air valve 76 which is illustrated in FIG. 2C as part of the fail-safe circuit 68. When the solenoid 74 is deactivated as illustrated in FIG. 2C, the valve assembly 76 is positioned for communicating an energizing port 126 with the separate air pressure source 70 through a manual regulator 128. The air cylinder 30 is then provided with a predetermined set air pressure as described above.

When the solenoid 74 is actuated with the switch 72 being in it automatic operating position and the fail-safe circuit 68 being energized, the air valve 76 is shifted to that vairable air pressure in the conduit 124 from the air amplifier 66 is supplied directly to the energizing port 126 for operating the cylinder 30.

The fail-safe circuit 68 is operated by a signal in the line 106 from the differential controller 60 (see FIG. 2A). The fail-safe circuit 68 functions to compare the signal in the line 106 with predetermined upper and lower limits in order to accomplish the functions referred to above.

For that purpose, the signal from the line 106 is applied to the base of transistors 130 and 132 (see FIG. 2C). An upper temperature out-off limit is established by the transistor 130 in combination with another transistor 134, an operational amplifier 136 and transistors 138 and 140. The reference signal is set by a resistor 142 to cause the operational amplifier 136 to apply a value setting through the transistor 134. The automatic signal is applied to the operational amplifier 136 through the transistor 130. When the value of the reference signal is reached, an output is supplied by the operational amplifier 136 to provide gate drive for the transistor 138. The transistor 138 then conducts to turn off the transistor 140 in order to deenergize the switch 72.

Similarly, a lower temperature cutoff is established by the transistor 132 in combination with another transistor 144, an operational amplifier 146, a transistor 148 and the common transistor 140. The lower reference signal is set by a resistor 150 while the automatic signal from the conduit 106 is applied to the operational amplifier 146 through the transistor 132. When the lower reference signal value is reached, output is produced on the operational amplifier 146 which provides gate drive for the transistor 148. The transistor 148 then conducts to turn off the transistor 140 which again deenergized the switch 72.

Thus, the control circuit 46 is illustrated by FIGS. 2A, 2B, and 2C in combination and also schematically in FIG. 1 together with the finishing machine 10 and functions automatically for adjusting regulating pressure in an outlet valve for the finishing machine.

Numerous variations and modifications will be apparent from the preceding description. Accordingly, the invention is defined only by the following appended claims.

What is claimed is:

1. A juice finishing machine, comprising:

a housing, a generally cylindrical perforated screen arranged in the housing, inlet means for introducing initial juice containing solids into an interior portion of the cylindrical screen, an element which is movable with respect to the screen for defining a variable solids outlet, screw means for urging the initial juice against the screen, and for conducting juice solids along the screen toward the outlet, juice solids tending to deposit in a pad area on the cylindrical screen adjacent the solids outlet, actuator means for developing variable pressure under which the movable element is urged toward the screen for regulating passage of juice solids from the screen interior, first temperature sensing means arranged adjacent the pad area of the cylindrical screen for measuring the temperature of the deposited juice solids, second temperature sensing means arranged adjacent the inlet means for measuring the temperature of initial juice introduced into the finishing machine, means for regulating operation of the actuator means, and adjusting means operatively coupled with the first and second temperature sensing means and with the regulating means for adjusting the actuator means relative to a differential between temperatures of the introduced initial juice and deposited juice solids and thereby automatically controlling finished quality of juice product from the finishing machine.

2. The juice finishing machine of claim 1 wherein each of the first and second temperature sensing means comprises means for producing an electrical signal proportional to the sensed temperature.

3. The juice finishing machine of claim 2 wherein the regulating means is pneumatically operated and wherein the adjusting means comprises means for producing pneumatic pressure proportional to the difference between the electrical signals from the first and second temperature sensing means and accordingly proportional to the temperature differential between the introduced intitial juice and the deposited juice solids.

4. The juice finishing machine of claim 3 further comprising fail-safe means operatively coupled with the regulating means for establishign adjustment limits for the actuator means.

5. The juice finisher machine of claim 4 wherein the fail-safe means further comprises means for overriding the regulating means and establishing a predetermined setting for the actuator means in the event that the adjustment limits are exceeded.

6. The juice finishing machine of claim 1 further comprising fail-safe means operatively coupled with the regulating means for establishing adjustment limits for the actuator means.

7. The juice finishing machine of claim 6 wherein the fail-safe means further comprises means for overriding the regulating means and establishing a predetermined setting for the actuator means in the event that the adjustment limits are exceeded.

8. The juice finishing machine of claim 1 further comprising:

first and second signal conditioner means coupled respectively with the first and second temperature sensor means for producing an output electrical signal proportional to the sensed temperature, differential controller means operatively coupled with the first and second signal conditioner means for receiving their respective output electrical signals and producing a differential electrical signal proportional to the difference between the sensed temperatures, and converter means for converting the differential electrical signal to a proportional pneumatic signal, the regulating means being responsive to the pneumatic signal for regulating operation of the actuator means.

9. The juice finishing machine of claim 8 further comprising fail-safe means operatively coupled with the regulating means for establishing adjustment limits for the actuator means.

10. The juice finishing machine of claim 9 wherein the fail-safe means further comprises means for overriding the regulating means and establishing a predetermined setting for the actuator means in the event that the adjustment limits are exceeded.

11. A juice finishing machine comprising:

a housing, a generally cylindrical perforated screen arranged in the housing, inlet means for introducing initial juice containing solids into an interior portion of the cylindrical screen, an element which is movable with respect to the screen for defining a variable solids outlet, screw means for urging the initial juice against the screen and for conducting juice solids along the screen toward the outlet, juice solids tending to deposit in a pad area on the cylindrical screen adjacent the solids outlet, actuator means for developing variable pressure under which the movable element is urged toward the screen for regulating passage of juice solids from the screen interior, temperature sensing means arranged adjacent the pad area of the screen for measuring the temperature of the deposited solids, means for regulating operation of the acutator means, and adjusting means operatively coupled with the temperature sensing means and with the regulating means for adjusting the actuator means realtive to the temperature of the deposited solids and thereby automatically controlling finished quality of juice product from the finishing machine.

12. The juice finishing machine of claim 11 wherein the temperature sensing means comprises means for producing an electrical signal proportional to the sensed temperature.

13. The juice finishing machine of claim 12 wherein the regulating means is pneumatically operated and wherein the adjusting means comprises means for producing pneumatic pressure proportional to the electrical signal from the temperature sensing means and accordingly proportional to the temperature of the deposited juice solids.

14. The juice finishing machine of claim 11 further comprising fail-safe means operatively coupled with the regulating means for establishing adjustment limits for the actuator means.

15. The juice finishing machine of claim 14 wherein the fail-safe means further comprises means for overriding the regulating means and for establishing a predetermined setting for the actuator means in the event that the adjustment limits are exceeded.

16. The juice finishing machine of claim 11 further comprising:

signal conditioner means coupled with the temperature sensor means for producing an output electrical signal proportional to the sensed temperature, controller means operatively coupled with the signal conditioner means for receiving the output electrical signal and producing an electrical signal proportional to the sensed temperature, converter means for converting the electrical signal from the controller means to a proportional pneumatic signal, the regulating means being responsive to the pneumatic signal for regulating operation of the actuator means.

17. The juice finishing machine of claim 16 further comprising fail-safe means operatively coupled with the regulating means for establishing adjustment limits for the actuator means.

18. A method for accomplishing automatic adjustment in a finishing machine of a type having a generally cylindrical perforated screen arranged in a housing, inlet means for introducing initial juice containing solids into an interior portion of the cylindrical screen, an element which is movable with respect to the screen to define a variable solids outlet, screw means for urging the initial juice against the screen, and for conducting juice solids along the screen toward the outlet, juice solids tending to deposit in a pad area on the cylindrical screen adjacent the solids outlet, and actuator means for devloping variable pressure under which the movable element is urged toward the screen for regulating passage of juice solids from the screen interior, the method comprising the steps of:

sensing the temperature of the deposited juice solids in the pad area of the screen, and adjusting the actuator means relative to the temperature of the deposited solids and thereby automatically controlling finished quality of juice product from the finishing machine.

19. The method of claim 18 wherein the temperature of initial juice introduced into the inlet means of the finishing machine is also sensed, the actuator means being adjusted relative to the difference between the temperature of the juice solids in the pad area and the temperature of the initial juice introduced into the inlet means of the finishing machine.

20. The method of claim 19 further comprising fail-safe means operatively coupled with the regulating means for establishing adjustment limits for the actuator means.

* * * * *

UNITED STATES PATENT AND TRADEMARK OFFICE

CERTIFICATE OF CORRECTION

PATENT NO. : 4,665,816

DATED : May 19, 1987

INVENTOR(S) : Roger D. Waters et al.

It is certified that error appears in the above-identified patent and that said Letters Patent is hereby corrected as shown below:

Column 10, line 15, "out-off" should read -- cut-off --.

Column 10, line 37, "deenergized" should read -- deenergize --.

Signed and Sealed this

Twenty-ninth Day of September, 1987

Attest:

DONALD J. QUIGG

*Attesting Officer* *Commissioner of Patents and Trademarks*